United States Patent [19]

Sakamoto et al.

[11] Patent Number: 5,006,589

[45] Date of Patent: Apr. 9, 1991

[54] POLYESTER FILM FOR MAGNETIC RECORDING MEDIA

[75] Inventors: Seiji Sakamoto, Machida; Chikakazu Kawaguchi, Atsugi; Yoshio Meguro, Machida; Takashi Harada, Yokohama; Toshifumi Takisawa, Nagahama, all of Japan

[73] Assignee: Diafoil Company, Limited, Tokyo, Japan

[21] Appl. No.: 360,781

[22] Filed: Jun. 2, 1989

[30] Foreign Application Priority Data

| Jun. 4, 1988 | [JP] | Japan | 63-138051 |
| Jun. 9, 1988 | [JP] | Japan | 63-142419 |
| Jul. 14, 1988 | [JP] | Japan | 63-175452 |
| Jul. 21, 1988 | [JP] | Japan | 63-182360 |
| Jul. 21, 1988 | [JP] | Japan | 63-182362 |
| Nov. 8, 1988 | [JP] | Japan | 63-281977 |

[51] Int. Cl.$^5$ .............................................. C08K 3/22
[52] U.S. Cl. .................................... 524/430; 524/425; 428/212; 428/220
[58] Field of Search ................. 524/430; 428/212, 220

[56] References Cited

U.S. PATENT DOCUMENTS

| 3,821,156 | 6/1974 | Farrar | 260/40 |
| 3,884,870 | 5/1975 | Dodson et al. | 428/220 |
| 3,980,611 | 9/1976 | Anderson et al. | 260/40 |
| 4,546,030 | 10/1985 | Minami et al. | 428/220 |

FOREIGN PATENT DOCUMENTS

| 78953 | 7/1977 | Japan . |
| 78954 | 7/1977 | Japan . |
| 15860 | 2/1980 | Japan . |
| 101136 | 8/1980 | Japan . |

OTHER PUBLICATIONS

Abstract corresponding to JP 55-101136.
Abstract corresponding to JP 55-15860.
Abstract Corresponding to JP 52-78954.
Abstract Corresponding to JP 52-78953.

*Primary Examiner*—Lewis T. Jacobs
*Attorney, Agent, or Firm*—Oblon, Spivak, McClelland, Maier & Neustadt

[57] ABSTRACT

Disclosed in this invention is a polyester film for magnetic recording media, containing 0.05 to 5% by weight of inactive inorganic particles (A) having a Mohs hardness of 6 or above and an average particle size of 0.005 to 1.0 μm and 0.01 to 2.0% by weight of inactive particles (B) having an average particle size which is greater than that of the particles (A) and in the range of 0.1 to 3.0 μm, the polyester film having an intrinsic viscosity in the range of 0.52 to 0.65. The polyester film of this invention is excellent in abrasion resistance, scuff resistance and slitting qualities and useful as a base film for magnetic recording media.

6 Claims, 1 Drawing Sheet

POLYESTER FILM FOR MAGNETIC RECORDING MEDIA

BACKGROUND OF THE INVENTION

The present invention relates to a polyester film which, when made into a magnetic tape, shows excellent electromagnetic properties, running properties and abrasion resistance. More particularly it relates to a base film for high-density magnetic recording media, which scarcely has scuffing and generates less abrasion dust during running of the tape and also enables easy cut of the magnetic tape made by using the film.

Polyester films have excellent physical and chemical properties and are widely used in the industries. Especially biaxially stretched polyethylene terephthalate films are superior to other types of film in flatness, mechanical strength and dimensional stability and now are essential as base for magnetic recording media.

On the other hand, improvements on magnetic recording media have been made rapidly in recent years, and this naturally has resulted in a severe requirement for quality of base film. For instance, base film is required to have a surface with a high degree of flatness for use in a magnetic tape, such as videotape, where high-density recording is made. However, as is well known, the higher the flatness of film surface, the greater becomes the friction between the film and the parts contacted therewith. This increases the risk of scuffing of the film and generation of abrasion dust to give rise to various troubles.

For example, if abrasion dust is generated at a production stage prior to the magnetic layer coating step, there may take place skips of coating of the magnetic layer or deposition of abrasion dust on the magnetic layer surface to cause increase of frequency of dropout. Also, if abrasion dust is generated in the course of calendering which is conducted for the purpose of flattening the magnetic layer surface, such abrasion dust will deposit as white powder on the calender roll surfaces to cause roughening of the magnetic layer suface and a deterioration in electromagnetic properties of the product. Further, if abrasion resistance of the film is poor, abrasion dust might be generated in the tape running system within the tape deck even after made into a product such as magnetic tape to cause lowering of electromagnetic properties or more frequent occurrence of dropout.

Recently, request is rising for the improvement of resistance to scuffing in addition to abrasion resistance of base film. Such a request is based on the fact that a tape may suffer scuffing by recording elements contact with the tape in the course of tape dubbing or other steps, or the fact that generated abrasion dust causes scuffing to the film. Such scuff marks are not only undesirable from viewpoint of appearance of appearance but also tend to cause contamination of working steps or increase of dropout.

It is known that abration resistance and scuff resistance can be improved by incorporating inactive fine particles in polyester film to roughen the film surface to a proper degree. Such moderate surface roughening is not only helpful for improving abrasion resistance and scuff resistance but also contributes to improvement of film workability or running properties of magnetic tape using the film, but this approach can not meet with recent strict requirements in quality. It is necessary for well satisfying such quality requirements to increase the amount of fine particles blended or increase the particle size, but this approach tends to raise the average surface roughness to an excessive degree or to increase the number of coarse surface protuberances due to the presence of coarse particles, resulting in a deterioration in electromagnetic conversion characteristics of magnetic tape or an increase in the frequency of dropout. It is quite difficult to satisfy these antinomic requirements at the same time. The only known effective method is so-called back coating, where an appropriate coating is formed on the back side of the film (the side opposite from the magnetic layer). This method, however, greatly increases the manufacturing cost and also involves many problems relating to film properties, so that this method has not been deemed practically suitable.

Another important property required of the base film for magnetic recording materials to possess is easiness to slit. If the base film is poor in cutting quality, when magnetic tape is slitted into the pieces of a given width, burrs are made at the slit end and, in some cases, the tape material may come off as powders from the slit end. When this phenomenon becomes more remarkable, fall-off of material in the form of powder from the magnetic layer may be caused, and such fallen-off powder may become a cause of dropout.

As a means for improving slitting quality, a method is known in which crystallinity of film is increased. However, an increase of crystallinity leads to deterioration of abrasion resistance, so that it is practically unsuitable to raise the crystallinity to excess. Currently, therefore, designing of base film is made by sacrificing the slitting quality to some extent.

Thus, it would be of great industrial significance if techniques were found by which it is possible to effectively improve, with simple means, abrasion resistance, scuff resistance and slitting quality (easiness to cut) of base film for magnetic recording media.

In view of the above, the present inventors have made strenuous studies on polyester films for magnetic recording media and, as a result, found that a polyester film containing certain specified fine particles has excellent abrasion resistance, scuff resistance and cutting quality (easiness to cut). The present invention was accomplished on the basis of such finding.

SUMMARY OF THE INVENTION

In an aspect of the present invention, there is provided a polyester film for magnetic recording media which contains 0.05 to 5% by weight of inactive inorganic particles (A) having a Mohs hardness of 6 or above and an average particle size of 0.005 to 1.0 μm and 0.01 to 2.0% by weight of inactive particles (B) having an average particle size which is greater than that of the particles (A) and in the range of 0.1 to 3.0 μm, the polyester film having an intrinsic viscosity in the range of 0.52 to 0.65.

DETAILED DESCRIPTION OF THE INVENTION

Figure 1:
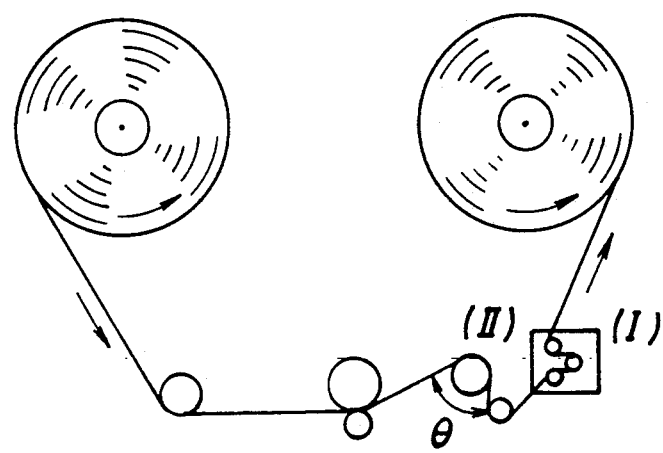
FIG. 1 illustrates a tape running system for evaluating abrasion resistance. (I): 6 m/mφ stainless fixed pin; (II): tension meter; $\theta = 135°$.

The term "polyester" used in the present specification refers to those polyesters which can be obtained by using an aromatic dicarboxylic acid such as terephthalic acid, 2,6-naphthalenedicarboxylic acid, etc., or an ester thereof, and ethylene glycol as main starting materials, but the polyester may contain other material as third component.

The dicarboxylic acids usable as a starting material in this invention include, for instance, isophthalic acid, phthalic acid, 2,6-naphthalenedicarboxylic acid, terephthalic acid, adipic acid, sebacic acid. These acids may be used either singly or in combination. The glycols usable as another starting material in this invention include ethylene glycol, propylene glycol, butanediol, 1,4-cyclohexanedimethanol, neopentyl glycol and the like, these being used either singly or in combination. As the third component, oxycarboxylic acid such as p-oxyethoxybenzoic acid may be sued. It is preferable that the polyester according to this invention is the one in which 80% or more of the constitutional repeating units are ethylene terephthalate units.

The polyester of this invention may contain suitable additives such as thermal stabilizer, anti-blocking agent, antioxidant, coloring matter, antistatic agent, ultraviolet absorber, and the like.

The characteristic features of the present invention reside in hardness of the particles blended in polyester, combined use of two or more types of particles different in particle size (diameter) from each other, and intrinsic viscosity of polyester film. It has been known that the improvements of handling workability and abrasion resistance of polyester film and the improvements of running properties, wear resistance and scuff resistance of magnetic tapes made by using the polyester film could be realized by adding fine particles inactive to polyester. The present inventors found that greater improvements of these properties, especially a striking improvement of scuff resistance, could be attained by using two types of particles (A) and (B), (A) being the inactive inorganic particles having a Mohs hardness of 6 or above and (B) being the inactive particles having an average particle size greater than that of (A). The present inventors further found that the cutting quality of magnetic tape, namely easiness of cutting magnetic tape to a given width, could be improved by controlling the intrinsic viscosity of the film within the range of 0.52 to 0.65, and these findings have led to the attainment of the present invention.

The inactive inorganic particles (A) having a Mohs hardness of 6 or above usable in the present invention include the particles of, for instance, $SiO_2$, $TiO_2$, $Al_2O_3$, SiC, zeolite and sellaite. Other similar materials are also usable as far as they have a Mohs hardness of 6 or above. Among them, $Al_2O_3$, SiC, TiC and titanium black, which are 8 or above in Mohs hardness, are preferred. $Al_2O_3$ is the most preferred.

Usually, aluminum oxide can be obtained by pyrolyzing an alumina hydrate such as gibbsite, bialite, boehmite, etc. In this case, about 10 different types of aluminum oxide differing in crystal form, i.e., $\alpha$-type, $\beta$-type, $\gamma$-type, $\kappa$-type, o-type, $\delta$-type, $\eta$-type, $\chi$-type, and $\rho$-type are formed according to the type of starting material used and the pyrolysis conditions, especially temperature. It is also possible to obtain aluminum oxide by burning and hydrolyzing aluminum chloride in the oxyhydrogen flames. In this case, there can be obtained aluminium oxide of different types of crystal form such as $\alpha$-type, $\gamma$-type, $\delta$-type, etc. according to the conditions.

$Al_2O_3$ which is preferably used in the present invention is the one that is usually obtained by a so-called pyrolytic method, and the particle size thereof generally ranging from about 0.01 $\mu$m to about 0.1 $\mu$m in diameter. A part of $Al_2O_3$, for example less than 30% by weight thereof, may be substituted with an oxide of Si, Na, K or other like element. In case of using $Al_2O_3$ as the inactive organic particle (A), it is especially preferable to employ $\delta$ type or $\gamma$ type.

The particle size distribution of the inactive inorganic particle (A) is not specifically limited, but it is preferred that the particle size distribution curve thereof is sharp. For instance, it is preferred to use the particles in which the particle size distribution ratio represented by the following formula:

$$\frac{d_{75}}{d_{25}}$$

wherein $d_{25}$ is the particle size of the particles when their cumulative weight is 25% based on their total weight, and $d_{75}$ is the particle size of the particles when their cumulative weight is 75% based on their total weight, the cumulative weight being calculated beginning with the smallest particle size, is 2.0 or less, preferably 1.5 or less, more preferably 1.3 or less.

The shape of the inactive inorganic particles (A) is also not restricted, but usually bulk or sphere is preferred. More precisely, the particle in which the volumetric shape factor of particles represented by the following formula:

$$\frac{V}{D^3}$$

wherein V is the volume of particle ($\mu m^3$) and D is maximum diameter ($\mu m$) on projected plan, is 0.1 to $\pi/6$, preferably 0.2 to $$\frac{\pi}{6}$$

is preferred.

The inactive inorganic particles (A) are also not specifically limited in their specific surface area. The particles with an average diameter of 0.5 $\mu$m have a specific surface area of about 6 $m^2/g$ when such particles are supposed to be perfectly spherical and to have a density of 2 $g/cm^3$. In the present invention, it is possible to use the particles ranging from such solid type to the porous ones with a specific surface area of about 400 $m^2/g$.

The inactive inorganic particles (A) may be modified in their surface by various types of surface treating agents.

These surface treating agents, which are usually used for the purpose of improving affinity for ethylene glycol or polyester, may be used in this invention in an amount of 5% by weight or less based on the particles. Typical examples of such surface treating agents usable in this invention are silane coupling agents and titanium coupling agents.

In the present invention, it is an essential requirement that the inactive inorganic particles (A) have a Mohs hardness of 6 or above because if the Mohs hardness of the particles is less than 6, their effect of improving scuff resistance is unsatisfactory. The mechanism of improvement of scuff resistance by the particles with a high Mohs hardness is not yet clarified. However, in view of the fact that the improving effect is remarkable with the particles having a higher hardness than parts with which the film contacts, it is considered that the particles forming the protuberances on the film surface act to abrade the sharp sections of the film contacting area to reduce the risk of scuffing of the film surface. In the present invention, inactive particles (B) having a greater average size than the inactive inorganic particles (A) of high hardness are also used. The particles (B) used in this invention may be either inorganic or organic particles as far as they are inactive to polyester, but it is especially preferable to use inorganic particles of a Mohs hardness lower than that of the inactive inorganic particles (A), heat-resistant polymer particles or deposited particles which separate out in the course of polyester preparation process.

A polymeric fine powder having a high degree of crosslinking can be cited as a typical example of heat-resistant polymer particles usable as the inactive particles (B) in this invention. Such polymeric fine powder can be, for example, the particles of a copolymer of a monovinyl compound (a) having only one aliphatic unsaturated bond in the molecule and a compound (b) having two or more aliphatic unsaturated bonds in the molecule and acting as a crosslinking agent. Such a copolymer may have a group reactable with polyester.

Examples of the compound (a) serving as a component of the copolymer are acrylic acid, methacrylic acid and their methyl or glycidyl esters, maleic anhydride and its alkyl derivatives, vinyl glycidyl ether, vinyl acetate, styrene, alkyl-substituted styrene and the like. Examples of the compound (b) are divinylbenzene, divinyl sulfone, ethylene glycol dimethacrylate and the like. There are used one or more of the compounds (a) and one or more of the compounds (b). Ethylene or a compound having nitrogen atoms may be copolymerized therewith.

Typical examples of such copolymers are methyl methacrylate-divinylbenzene copolymer, and methyl acrylate-divinylbenzene copolymer.

A crosslinked polymer having carboxyl groups can be easily obtained by saponifying the above crosslinked polymer having alkyl ester groups or by carrying out the copolymerization by using methacrylic acid instead of methacrylic acid ester or acrylic acid instead of acrylic acid ester. The commercially available weakly acidic cation exchange resins have a crosslinked structure as well as carboxyl groups, so that they can be preferably used as the heat-resistance polymer in the present invention. It is also possible to utilize a crosslinked polymer having alkyl ester groups which is an intermediate material of the resins.

A copolymer of styrene and divinylbenzene is also preferred for use in this invention.

The heat-resistance polymer particles may be porous. For forming the porous particles, generally a method is favorably employed in which a compound (c) is allowed to exist in the course of copolymerization of the compounds (a) and (b), and after polymerization, the compound (c) is removed with an organic solvent. Examples of the compound (c) usable here are hydrocarbon compounds such as n-hexane, n-heptane, cyclohexane, kerosene, toluene and xylene, alcohol compounds such as n-butanol, n-hexanol and propyl alcohol, polystyrene, polyvinyl alcohol, polyalkylene oxide, and the like.

Copolymerization of the compounds (a) and (b) can be started by using a known chemical radical initiator such as azoisobutyronitrile, benzoyl peroxide, t-butyl peroxide, cumene hydroperoxide, etc., or by irradiating ultraviolet. Also, polymerization can be initiated by simply heating the compounds.

In any case, the copolymer must be the one which has a crosslinked structure and is also substantially insoluble and infusible at high temperatures in the course of preparation of polyeser or molding thereof. For meeting such a requirement, the crosslinked polymer needs to have a degree of crosslinking of 6 to 50%, preferably 7 to 45%. The "degree of crosslinking" referred to herein represents the numerical value determined from the following formula:

$$\text{Degree of crosslinking (\%)} = \frac{\text{weight of divinyl compound}}{\text{overall monomer weight}} \times 100$$

When the thus determined value of the degree of crosslinking is less than 6%, it becomes difficult to crush the polymer. Even when the value exceeds 50%, there is provided no additional effect in easiness of polymer crushing and rather the density of the functional group is reduced, resulting in a weakened force of binding with polyester.

The heat-resistant polymeric fine powder usable in this invention is not limited to the above copolymers. For example, thermosetting phenolic resin, thermosetting epoxy resin, thermosetting urea resin, benzoguanamine resin or fluorine resins such as polytetrafluoroethylene is also possible to use.

The inactive deposited particles separating out in the reaction system, which can be used as the inactive particles (B) in the present invention, are those which separate out in the reaction system in which polymerization is carried out in a usual way and an alkali metal or alkali earth metal compound is used as an ester exchange catalyst. Such particles may be caused to separate out by adding terephthalic acid in the course of ester exchange reaction or polycondensation reaction. In these cases, one or more of phosphorus compounds such as phosphoric acid, trimethyl phosphate, triethyl phosphate, tributyl phosphate, acid ethyl phosphate, phosphorous acid, trimethyl phosphite, triethyl phosphite, tributyl phosphite and the like may be allowed to exist.

The inactive deposited particles may be also caused to separate out by the above methods even when an esterification step is involved in the process. For example, an alkali metal or alkali earth metal compound is introduced into the system either before or after the completion of the esterification reaction, and then the polymerization reaction is carried out in the presence or absence of a phosphorus compound.

In either case, at least one of such elements as calcium, lithium, antimony and phosphorus is contained in the fine compound particles separating out in the course of polyester forming reaction in the present invention. For instance, in case of using calcium acetate as ester exchange catalyst, a calcium compound composed of calcium terephthalate and calcium salt of a polyester oligomer, which is supposed to have the following structure (1), separates out in the course of polymerization reaction of terephthalic acid and ethylene glycol:

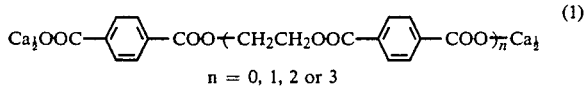

$$n = 0, 1, 2 \text{ or } 3 \quad (1)$$

In case of additionally using a phosphorus compound in this system, it is considered that a compound supposed to have the following structural formula (2) separates out in addition to the compound of the above formula (1).

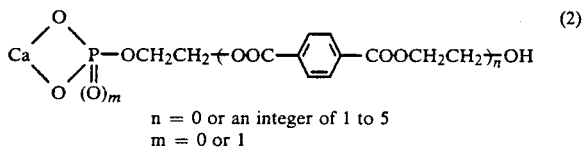

n = 0 or an integer of 1 to 5
m = 0 or 1

In case of using a lithium compound instead of a calcium compound, a compound supposed to have the following structure (3) separates out in the course of polycondensation reaction.

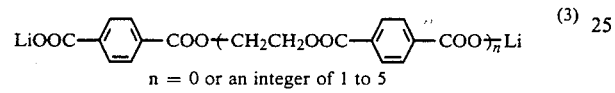

n = 0 or an integer of 1 to 5

In case a phosphorus compound is additionally used in this system, it is considered that a compound of the following structure (4) separates out in addition to the compound of the formula (3):

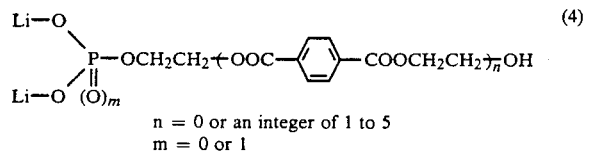

n = 0 or an integer of 1 to 5
m = 0 or 1

In case of using both a calcium compound and a lithium compound in combination, it is considered that a complicate compound such as represented by the following formula (5) separates out in addition to the compounds of the above-shown formulae (1) and (4).

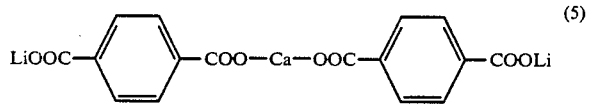

In case a phosphorus compound is additionally used in this system, it is supposed that a complicate compound such as represented by the following formula (6) separates out along with the compounds of the formulae (1)–(3):

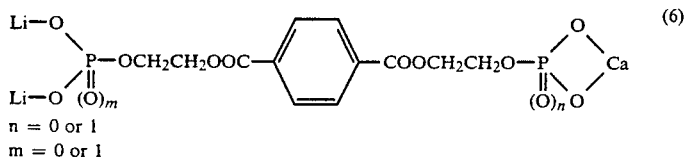

n = 0 or 1
m = 0 or 1

There are so many preparation processes for the deposited particles which are usable in this invention, and it is hardly possible to describe here all of such processes in detail. The following are some preferred examples of such processes.

(1) In case the polycondensation reaction is carried out by using a lithium compound as ester exchange reaction catalyst in an amount of 0.1 to 0.5% by mole based on the overall acid component of polyester, there can be obtained a polyester containing 0.05 to 0.3% by weight of deposited particles having an average particle size of 0.5 to 2 μm.

(2) In this case, when the same reaction is carried out by adding phosphoric acid in an amount of 0.5 to 1.5 times the lithium compound by mole after the completion of the ester exchange reaction, there can be obtained a polyester containing 0.05 to 0.2% by weight of deposited particles having an average particle size of about 0.3 to 1 μm.

(3) In the process (2), in case a trialkyl ester such as trimethyl phosphate, triethyl phosphate or tributyl phosphate is used in place of phosphoric acid, the amount of deposited particles contained in the polyester becomes 0.1 to 0.5% by weight.

(4) In case of carrying out the polycondensation reaction by using a calcium compound as ester exchange catalyst in an amount of 0.05 to 0.15% by mole, there can be obtained a polyester containing 0.05 to 0.4% by weight of deposited particles having an average particle size of about 1 to 3 μm.

(5) In this operation, when terephthalic acid is added after the completion of the ester exchange reaction, the deposited particles have an average particle size of about 0.5 to 2 μm.

Needless to say, the size and amount of the deposited particles are subject to change according to the polymerization conditions, especially temperature and pressure. The above-shown particle size and amounts are therefore merely illustrative.

In the present invention, it is preferred, in any case, that the inactive particles (B) are lower in Mohs hardness than the inactive inorganic particles (A). If necessary, the particles (B) may comprise two or more different types of particles.

The present invention is further characterized by the fact that the intrinsic viscosity of the polyester film according to this invention falls within the range of 0.52 to 0.65. Generally, the lower the intrinsic viscosity of the film, the better is the cutting quality of the film, but it is to be noted that when the intrinsic viscosity is less than 0.52, there tends to take place break of the film in its forming process to badly affect the productivity. On the other hand, when the intrinsic viscosity exceeds 0.65, there can not be obtained a desired improvement of slitting quality. The preferred range of intrinsic viscosity is from 0.54 to 0.62, and more preferred is 0.54 to 0.60.

The inactive inorganic particles (A) used in the present invention are the particles having an average particle size of 0.005 to 1.0 μm, and the content thereof in the film is 0.05 to 5% by weight, preferably 0.1 to 2% by weight, based on the polyester. The inactive particles (B) used together with the particles (A) in this invention are those particles whose average particle size is greater than that of the particles (A) and in the range of 0.1 to 3.0 μm, preferably 0.3 to 1.5 μm, and the content thereof in the film is 0.01 to 2.0% by weight, preferably 0.05 to 1.0% by weight, based on the polyester.

When the average particle size of the particles (A) is greater than 1.0 μm, the effect of the larger particles (particles (B)) becomes unsatisfactory, resulting in poor slipperiness and abrasion resistance. When the average particle size of the particles (A) is less than 0.005 μm, the desired improvement of scuffing resistance is not provided. Also, hen the content of the particles (A) in the film is less than 0.05% by weight, there is observed no improvement of scuff resistance. When the content exceeds 5% by weight, there are produced coarse protuberances due to agglomeration of particles to cause a deterioration of electro-magnetic conversion properties of magnetic tapes or an increase of dropout.

On the other hand, when the average particles size of the particles (B) is less than 0.1 μm, there results a deterioration of handling qualities and abrasion resistance of the film and a degradation of running properties and wear resistance of the magnetic tapes using the film. When the average particle size exceeds 3 μm, the film surface roughness becomes higher than necessary to invite a deterioration of electro-magnetic conversion properties of magnetic tapes. When the content of the particles (B) is less than 0.01% by weight, the handling qualities and abrasion resistance of the film are deteriorated as so are running properties and wear resistance of magnetic tapes. When the content exceeds 2% by weight, the film surface roughness becomes too high or there are formed coarse protuberances due to agglomeration of particles, causing a deterioration of electromagnetic properties of magnetic tapes or an increase of dropout.

The particles used in the present invention are preferably subjected to the ordinarily practiced grinding treatment, classification and filtration to remove coarse particles. For the grinding treatment, there can be used, for instance, rod mill, ball mill, oscillating rod mill, oscillating ball mill, pan mill, roller mill, impact mill, disc mill, stirring grinding mill, fluid energy mill and the like. For classification, semi-free vortex type method, forced vortex type method, hydrocyclone method, centrifugal method, etc. may be used. These methods may be used in combination.

In the present invention, the particles may be added into polyester at any time before the start of, during or after the polycondensation reaction. Preferably, the particles are added before starting the polycondensation reaction or in the early phase of the reaction. For incorporating two or more types of particles in the film according to this invention, each type of particles are added independently into polyester, and the predetermined amounts of the respective polyesters containing each type of particles are blended when forming a film, or the predetermined amounts of the respective types of particles are added simultaneously into polyester.

Usually an Sb, Ti, Sn or Si compound is used as polycondensation reaction catalyst.

In the present invention, when the refractive index ($n_\alpha$) of the film in its thickness direction is 1.492 or greater, the running properties, abrasion resistance and scuff resistance are further improved. For obtaining a film having such a refractive index, in the case of successive biaxial stretching, stretching in the machine direction is conducted at a temperature of about 105° to 115° C. which is 5° to 30° C. higher than the ordinary stretching temperature, or the biaxially stretched film is subjected to a high degree of relaxation in transverse direction before heat treatment. In the present invention, the upper limit of $n_\alpha$ is preferably around 1.510.

The effect of the present invention is maximized when the film thickness is 12.0 μm or less, especially 10.0 μm or less, and the F-5 value of the film in the machine direction is 12.0 kg/mm$^2$ or above, especially 14 kg/mm$^2$ or above. Such a film can be obtained by employing, for instance, the following film forming method.

Polyester chips are melt extruded into a sheet form at 270° to 300° C., then cooled to 40° to 70° C. and solidified to form an amorphous sheet. This sheet is biaxially stretched in the machine and transverse directions successively or simultaneously, then restretched 1.05 to 2.0 times in the machine direction at 110° to 180° C. and subjected to a heat treatment at 160° to 240° C. In these operations, it is possible to optionally employ such techniques as heat setting before restretching in the machine direction, relaxing in the machine direction after the machine direction restretching, and a small degree of stretching in the machine direction before or after the machine direction restretching.

It was further found that when the difference ($\Delta n$) between refractive index $n_{TD}$ in the transverse direction of the film and refractive index $n_{MD}$ in the machine direction is made of 0.010 or greater, it is possible to achieve a further improvement of scuff resistance and a great improvement of slitting qualities.

This indicates that the polyester molecular chain is oriented rather in the transverse direction than in the machine direction. For obtaining such a film, a method is employed in which, for instance, an amorphous unstretched polyethylene terephthalate film is first stretched 3.0 to 4.0 times in the machine direction at about 90° C., then further stretched in the transverse direction 4.0 to 6.0 times at 90° to 150° C., and then heat set at 170° to 230° C. In these operations, the value of $\Delta n$ is preferably 0.020 or greater, more preferably 0.025 or greater. A too large value of $\Delta n$, however, leads to a too strong anisotropy, which tends to give adverse effects to the film qualities such as heat shrinkage. Therefore, the value of $\Delta n$ is preferably not greater than 0.060.

In case of using the film of this invention as a base film for magnetic tapes, it is preferable to select the film forming conditions such that the average refractive index ($\overline{n}$) of the film will fall within the range of 1.598 to 1.604. When $\overline{n}$ is less than 1.598, the dimensional stability of the film is deteriorated when some heat is given to the film. When $\overline{n}$ exceeds 1.604, the film surface becomes frail and the particles contained therein fall off to form white powder in the calendering and other steps to cause contamination of the equipments and re-deposition of white powder on the tapes to induce dropout. The preferred range of $\overline{n}$ is from 1.600 to 1.603.

The magnetic recording media to which the film of this invention can be most effectively applied are the tape type ones. The magnetic layer in such recording media can be formed either by "coating" or by "deposition".

The magnetic layer coated type magnetic tape can be produced by coating a polyester film with a composition comprising magnetic powder, binder resin, antistatic agent, abrasive, lubricant, dispersant, plasticizer and other additives. The effect of the film of this invention won't be affected by the type of these additives. As magnetic powder, for instance, thee can be used γ-iron oxide, cobalt-dope γ-iron oxide, chromium dioxide, iron, etc. As binder resin, vinyl resins, cellulose resins, urethane resins epoxy resins, phenoxy resins and the like may be used either singly or in combination.

The film of the present invention can be also applied for forming a magnetic layer of smaller thickness by utilizing vacuum deposition or plating. In this case, as magnetic material, there can be used γ-iron oxide, cobalt-dope γ-iron oxide, cobalt-nickel, iron-cobalt-nickel, and the like.

The present invention will hereinafter be described in further detail by showing the examples thereof, but it should be understood that the invention is not limited to these examples. In the following descriptions of the Examples and Comparative Examples, all "parts" are by weight unless otherwise noted.

The methods used for determining the various factors and properties in the following Examples and Comparative Examples are as follows.

(1) Average particle size

The sizes of the particles were measured by a microscope, and the particle size (diameter) of the particles which show 50% volume fraction calculated in terms of equivalent spheres was designated as average particle size (diameter).

(2) Center line averaged surface roughness (Ra)

This was determined as follows by using a surface roughness meter SE-3FK made by Kosaka Kenkyusho Ltd. The feeler had a radius of 2 μm at its end, and the load applied was 30 mg. A portion with the standard length L (2.5 mm) was sampled from the film surface roughness curve toward its center line, and by taking the center line of the sampled portion on X-axis and the direction vertical to the center line on Y-axis and expressing the roughness curve $y=f(x)$. The surface roughness (Ra) was determined from the following equation:

$$Ra = \frac{1}{L} \int_{O}^{L} |f(x)| dX \ (\mu m)$$

The cut-off value was 0.08 μm.

(3) Abrasion resistance

By using a film running system shown in FIG. 1, the film was let run through a distance of 200 meters, and the amount of worn-out white powder adhering to a fixed pin was visually observed and evaluated on the following criterion.

Rank A: White powder adhered slightly.
Rank B: A small amount (greater than Rank A) of white powder adhered.
Rank C: White powder adhered heavily and not practicable.

(4) Running properties

The film was contacted with a fixed hard chrome-plated metal roll (6 mm in diameter) at a winding angle of 135° (2.356 rad ($\theta$)). With a load of 53 g ($T_2$) applied to an end, the film was let run at a speed of 1 m/min, measuring the resisting force ($T_1$, g) at the other end, and the coefficient of friction ($\mu d$) of the running film was determined from the following equation:

$$\mu d = \frac{1}{\theta} \ln \frac{T_1}{T_2} = 0.424 \ln \frac{T_1}{53}$$

(5) Scuff resistance

Wear of a metallic pin and that of a plastic pin by frictional passage thereon of a magnetic tape were evaluated. The magnetic tape used here was produced as follows.

200 parts of fine magnetic powder, 30 parts of polyurethane resin, 10 parts of nitrocellulose, 10 parts of vinyl chloride-vinyl acetate copolymer, 5 parts of lecithin, 100 parts of cyclohexanone, 100 parts of methyl isobutyl ketone and 300 parts of methyl ethyl ketone were mixed and dispersed in a ball mill for 48 hours, followed by the addition of 5 parts of a polyisocyanate compound to prepare a magnetic coating material. This coating material was coated on a polyester film. The film was magnetically oriented before the coating material was sufficiently dried and solidified. Then the coat was dried to form a 2 μm thick magnetic layer. This coated film was subjected to a surface treatment by a supercalender and then slit into a ½ inch width to form a video tape.

The thus obtained magnetic tape was passed round a hard chrome-plated metallic pin (diameter=6 mm, surface roughness=3 S) so that the base film side would contact with the pin at a winding angle of 135° and a tension of 50 g, and the tape was let run at a speed of 4 m/sec.

Then aluminum was deposited on base film side of the magnetic tape, and the degree of scuff was visually judged. The abrasion by the passage of the magnetic tape was evaluated according to the following 5-rank system:

Rank 1: The film suffered many scuffs, some of them being deep.
Rank 2: The film suffered a relatively large number of scuffs, some of them being deep.
Rank 3: The number of the scuffs on the film was relatively small, and there were few deep ones.
Rank 4: A few scuffs were seen, but no problem in practical use.
Rank 5: The film was almost free of scuff.

Separately, the base film side of the magnetic tape was placed in contact with a 6 mm-diameter nylon pin which had been subjected to a smoothing treatment, and the tape was let run in frictional contact with the pin at a speed of 4 m/sec. The degree of abrasion of the pin and the formation of white powder were examined after tape run of 2,000 meters, and the abrasion characteristics of the magnetic tape on the plastic pin was evaluated according to the following 5-rank system;

Rank 1: A great many streaks were formed on the pin, and also white powder was seen heavily deposited on the pin.
Rank 1: A fairly large number of streaks were observed on the pin, and also white powder deposition was relatively thick.
Rank 3: Shallow streaks were seen, but white powder was small in amount.
Rank 4: A few shallow streaks were seen, but white powder was slight in amount.
Rank 5: The pin was almost free of streaks, and also none or only a trace of white powder was seen.

(6) Scuff resistance of magnetic layer

A magnetic tape produced in a similar manner as in (5) was wound at a speed of 20 m/sec and a tension of 100 g in a length of 8,000 m. Then, the tape was rewound and the degree of scuff on magnetic layer was visually observed. The evaluation was made according to the following 5-rank system.:

Rank 1: Many scuffs, some of them being deep.
Rank 2: Relatively large number of scuffs, some of them being deep.
Rank 3: Relatively small number of scuffs, and few deep scuff.
Rank 4: A few scuffs, but no problem in practical use.
Rank 5: Substantially no scuff.

(7) F-5

The stress (kg/mm$^2$) at 5% elongation was measured by using an Instron tension tester.

From a biaxially stretched film, there were cut out 5 sample pieces each measuring 150 mm in longitudinal length and 6.25 mm in transverse length, and each sample piece was subjected to a tensile test at a tensile speed of 50 mm/min, with both chack interval and gage interval set at 50 mm.

The load at 5% elongation was read from the obtained S-S curve, and the F-5 value was calculated from the following equation. The average of measurements on 5 samples was employed.

$$F\text{-}5 = \frac{\text{load (kg) at 5\% elongation}}{\text{sectional area (mm}^2\text{) of test piece}}$$

(8) Refractive index of film

Measured by using an Abbe's refractometer mfd. by Atago Kogaku Co., Ltd., by using a sodium D line at 23° C. Assuming that the refractive indices in the transverse direction, machine direction and thickness direction of the film are $n_{TD}$, $n_{MD}$ and $n_{60}$, respectively, then $\Delta n$ and $\bar{n}0$ are calculated from the following equations:

$$\Delta n = n_{TD} - n_{MD} \quad (1)$$

$$\bar{n} = (n_{TD} + n_{MD} + n\alpha)/3 \quad (2)$$

(9) Intrinsic viscosity [η]

1 g of polymer was dissolved in 100 ml of a 50/50 (by weight) mixture of phenol and tetrachloroethane, and the intrinsic viscosity of the solution was measured at 30° C.

(10) Electromagnetic properties

The electromagnetic properties of a magnetic tape obtained according to the method described in (5) above were determined by using a video deck Model NV-3700 mfd. by Matsushita Electric Co., Ltd.

VTR head output

The VTR head output at a measuring frequency of 4 MHz was determined by a synchroscope. Blank was supposed to be 0 dB, and its relative value was shown in dB.

Dropout count

A video tape on which 4.4 MHz signals had been recorded was played back, and the number of dropouts was counted for a period of 20 minutes by a dropout counter made by Ohkura Industries Co., Ltd. The counted number was converted to the dropout count per minute.

(11) Slitting quality

The state of the slit section of a broad coated magnetic tape when slit into a ½ inch width was observed by an electron microscope and evaluated on the following three-rank (A, B and C) system:

A: There was seen no streak-like burr at the slit section nor formation of cuttings.
C: Streak-like burr was seen all over the slit section, and there was also observed formation of cuttings.
B: Intermediate between A and C.

Example 1:

Production of polyester film 100 parts of dimethyl terephthalate, 60 parts of ethylene glycol and 0.09 part of magnesium acetate tetrahydrate were heated in a reactor to evaporate away methanol and carry out an ester exchange reaction. The mixture was heated to 230° C. over a period of 4 hours to substantially complete the ester exchange reaction. To the reaction mixture, were added 0.5% of ground, classified and filtered Al particles having an average size of 0.02 μm, followed by further addition of 0.04 part of ethyl acid phosphate and 0.04 part of antimony trioxide to carry out a polycondensation reaction for 4 hours to obtain a polyester (I) having an intrinsic viscosity of 0.61.

Separately from the above operations, there were similarly carried out an ester exchange reaction and a polycondensation reaction by adding 1.0% of $SiO_2$ with an average size of 0.7 μm in place of the $Al_2O_3$ to obtain a polyester (II) having an instrinsic viscosity of 0.60.

Then 80 parts of polyester (I) and 20 parts of polyester (II) were uniformly blended and after dried at 180° C., the mixture was extruded into a sheet at 290° C. and then cooled by an electrostatic charge cooling method to obtain an amorphous film having a thickness of 200 μm.

The amorphous film was stretched 3.5 times in the machine direction at 110° C., further stretched 3.5 times in the transverse direction at 110° C., then heat treated at 220° C. for 3 seconds and then cooled to obtain a biaxially stretched polyester film having a thickness of 15 μm. Production of magnetic tape On the biaxially stretched polyester film, was formed a magnetic layer and its slitting qualities and electromagnetic properties were determined. The results are shown in Table 1.

Examples 2-4:

Polyester films and magnetic tapes were produced in the same way as Example 1 except that the type and size of the particles contained in polyester (I) and polyester (II) were changed, that the both polyesters (I) and (II) were blended so that the content of each particle would be as shown in Table 1, and that the stretching conditions were changed so that the refractive index in the thickness direction of the films would have the values shown in Table 1.

The results are shown in Table 1.

Comparative Examples 1-4:

Polyester films were obtained by changing the type of particles added to polyester (I) and polyester (II), intrinsic viscosity of the polyesters and film stretching conditions. The properties of the obtained polyester films and the properties of the magnetic tapes made therefrom are shown in Table 1.

The films of Examples 1-4, which met the requirements of the present invention, showed excellent running properties and abrasion resistance. Also, the magnetic tapes made by using these films caused no fall-off of cuttings when they were slit to a desired width. They also showed excellent scuff resistance in running at high speed.

On the other hand, in the case of Comparative Example 1 in which Mohs hardness of the particles used was outside the range specified in the present invention, the produced magnetic tape was poor in scuff resistance.

In Comparative Example 2 in which intrinsic viscosity of the film was beyond the upper limit of the range specified in the present invention, the obtained magnetic tape was poor in slitting qualities and, when slit, it formed cuttings and also caused fall-off of powder from the magnetic layer, resulting in an increased number of dropouts in the tape.

In the case of Comparative Examples 3 and 4 which didn't met the requirements of the present invention in Mohs hardness of the particles and in use of the particles (only one type of particles were used in these comparative examples) and in which refractive index in thickness direction of the film was below the specified range of the present invention, the obtained magnetic tapes were poor in scuff resistance, caused fall-off of abrasion powder and were readily subjected to scuffing.

TABLE 1

| Examples or Comp. Examples | Particles A | | | | Particles B | | | | Intrinsic viscosity ($\eta$) | Film properties Refractive index in thickness direction ($n\alpha$) |
|---|---|---|---|---|---|---|---|---|---|---|
| | Type | Mohs hardness | Size ($\mu$m) | Content (wt %) | Type | Mohs hardness | Size ($\mu$m) | Content (wt %) | | |
| Example | | | | | | | | | | |
| 1 | $Al_2O_3$ | 9 | 0.02 | 0.4 | $SiO_2$ | 6-7 | 0.7 | 0.2 | 0.57 | 1.496 |
| 2 | $Al_2O_3$ | 9 | 0.02 | 0.3 | $CaCO_3$ | 3 | 0.6 | 0.2 | 0.56 | 1.497 |
| 3 | $SiO_2$ | 6-7 | 0.03 | 0.3 | $SiO_2$ | 6-7 | 0.7 | 0.2 | 0.56 | 1.498 |
| 4 | SiC | 9 | 0.07 | 0.5 | Kaolin | 3 | 0.8 | 0.3 | 0.58 | 1.501 |
| Comp. Example | | | | | | | | | | |
| 1 | $CaCO_3$ | 3 | 0.1 | 0.5 | $CaCO_3$ | 3 | 0.6 | 0.2 | 0.58 | 1.498 |
| 2 | $Al_2O_3$ | 9 | 0.03 | 0.4 | $SiO_2$ | 6-7 | 0.7 | 0.03 | 0.66 | 1.497 |
| 3 | Organic cross-linked polymer | 1 | 0.09 | 0.3 | $CaCO_3$ | 3 | 0.6 | 0.2 | 0.56 | 1.489 |
| 4 | — | — | — | — | Kaolin | 3 | 0.8 | 0.3 | 0.63 | 1.490 |

| Examples or Comp. Examples | Film properties Coefficient of friction ($\mu$) | Abrasion resistance | Scuff resistance | Magnetic tape properties S/N (d$\beta$) | Dropout (number/min) | Slitting qualities |
|---|---|---|---|---|---|---|
| Example | | | | | | |
| 1 | 0.24 | A | 5 | +1.2 | 1.8 | A |
| 2 | 0.25 | A | 5 | +1.0 | 2.1 | A |
| 3 | 0.24 | A | 4 | +1.1 | 1.5 | A |
| 4 | 0.27 | A | 4 | +0.7 | 1.3 | A |
| Comp. Example | | | | | | |
| 1 | 0.25 | A | 2 | +1.0 | 2.3 | A |
| 2 | 0.40 | A | 4 | +3.5 | 0.5 | C |
| 3 | 0.30 | C | 1 | +0.8 | 1.8 | A |
| 4 | 0.33 | B | 1 | +0.9 | 1.0 | B |

Example 5:

100 parts of dimethyl terephthalate, 70 parts ethylene glycol, 0.10 part of calcium acetate monohydrate and 0.18 part of lithium acetate dihydrate were mixed and heated in a reactor to evaporate away methanol and carry out an ester exchange reaction. The mixture was heated to 230° C. over a period of about 4 hours to substantially complete the ester exchange reaction.

To the reaction mixture, were added 0.31 part of triethyl phosphate and 0.04 part of antimony trioxide, followed by polymerization of the mixture in the usual way for 4 hours to obtain polyethylene terephthalate having an intrinsic viscosity of 0.66 (polyester (III)).

A large number of uniform and fine deposited particles (0.8 $\mu$m in diameter) separated out in the polyester. The amount of these particles as measured by the usual method was 0.37% by weight based on the polyester.

Separately from the above operations, 100 parts of dimethyl terephthalate, 70 parts of ethylene glycol and 0.09 part of magnesium acetate tetrahydrate were mixed and heated in a reactor to evaporate away methanol and carry out an ester exchange reaction. The mixture was heated to 230° C. over a period of about 4 hours to complete the ester exchange reaction.

To the reaction mixture, was added 1.0 part of aluminum oxide having an average particle size of 0.02 $\mu$m, which had been obtained by a pyrolytic method, followed by further addition of 0.04 part of triethyl phosphate and 0.04 part of antimony trioxide, and the mixture was subjected to a polycondensation reaction by a conventional method to obtain polyethylene terephthalate having an intrinsic viscosity of 0.66 (polyester (IV)).

Aluminum oxide was uniformly dispersed in the polyester, and substantially no agglomerate of particles was seen.

Then polyester (III) and polyester (IV) were mixed in a weight ratio of 70:30 and, after dried, extruded into a sheet at 290° C. from an extruder to obtain an amor-

Comparative Examples 5–8:

Biaxially oriented films having a thickness of 15 μm were obtained by following the process of Example 1 except that the particles contained in the polyethylene terephthalate film were changed as shown in Table 2. Also, magnetic tapes were made by using the biaxially oriented films, and the properties of the films and magnetic tapes were evaluated.

The results of evaluation are shown collectively in Table 2.

TABLE 2

| | Particles A | | Particles B | | | Film properties | | | Magnetic tape properties | | |
|---|---|---|---|---|---|---|---|---|---|---|---|
| | Av. particle size μm | Content in film wt % | Type | Av. particle size μm | Content in film wt % | Ra μm | Slipperiness | Abrasion resistance | Scuff resistance | S/N | Drop-out |
| Example | | | | | | | | | | | |
| 5 | 0.8 | 0.26 | $Al_2O_3$ | 0.02 | 0.30 | 0.016 | 0.38 | A | 5 | +2.1 | 1.8 |
| 6 | 0.8 | 0.30 | $Al_2O_3$ | 0.40 | 0.35 | 0.020 | 0.33 | A | 5 | +1.5 | 2.0 |
| 7 | 0.5 | 0.20 | $Al_2O_3$ | 0.05 | 0.30 | 0.013 | 0.40 | A | 5 | +2.0 | 1.8 |
| 8 | 0.5 | 0.20 | SiC | 0.30 | 0.40 | 0.015 | 0.35 | A | 4 | +1.6 | 2.1 |
| Comp. Example | | | | | | | | | | | |
| 5 | 0.8 | 0.26 | — | — | — | 0.016 | 0.38 | B | 1 | −3.0 | 15.1 |
| 6 | 0.8 | 0.26 | $CaCO_3$ | 0.40 | 0.35 | 0.021 | 0.35 | B | 1-2 | −2.3 | 10.5 |
| 7 | 0.8 | 0.26 | $Al_2O_3$ | 1.30 | 0.35 | 0.035 | 0.25 | C | 5 | −4.5 | 6.8 |
| 8 | — | — | $Al_2O_3$ | 0.03 | 0.30 | 0.004 | >1 | C | 4 | −3.0 | 16.2 | phous sheet. In this operation, there was employed a so-called electrostatic charge cooling method in which the sheet is electrostatically charged. The sheet was then stretched 3.5 times in the machine direction and 3.4 times in the transverse direction and heat treated at 225° C. to obtain a biaxially stretched film having a thickness of 15 μm.

On this polyester film, was formed a magnetic layer to form a magnetic tape and its scuff resistance and electromagnetic properties were evaluated.

Example 6:

A polyethylene terephthalate film and a magnetic tape using the film were obtained in the same way as Example 5 except that the amount (content) of the particles which separated out in the polyester, average size of the particles added and their amount blended were changed as shown in Table 2.

Example 7:

A polyester containing deposited particles having an average size of 0.5 μm was obtained in the same way as Example 5 except that 0.26 part of triethyl phosphate and 0.05 part of acid ethyl phosphate were used in place of 0.31 part of triethyl phosphate used in the production of polyester (III) in Example 5. By mixing the polyester and a polyester containing aluminum oxide particles, there was obtained a polyethylene terephthalate film containing the particles shown in Table 2. A magnetic tape was made by using the film and its properties were evaluated similarly to Example 5.

Example 8:

By mixing a polyester containing the deposited particles obtained in Example 7 and a polyester containing silicon carbide particles, there was obtained a polyethylene terephthalate film containing the particles shown in Table 2. The properties of this film and those of a magnetic tape made therefrom were evaluated.

The films of Examples 5–8, which met the specified requirements of the present invention, were all excellent in slipperiness and abrasion resistance. Also, the magnetic tapes made by using these films were excellent in scuff resistance, which assures a highly satisfactory level of electromagnetic properties of the magnetic tapes.

On the other hand, in Comparative Example 5 where the film was formed by using deposited particles alone without using the additive particles specified in the present invention, the magnetic tape made by using such a film was poor in scuff resistance and accordingly unsatisfactory in electromagnetic properties.

In the case of Comparative Example 6 in which calcium carbonate particles with a Mohs hardness of 3 were used as additive particles, the obtained magnetic tape was not improved at all in scuff resistance and poor in properties.

In Comparative Example 7, the additive particles used jointly with deposited particles were those having a Mohs hardness above 6 but larger than 1 μm in average size. The film obtained in this example had a too high surface roughness and also the particles added would come off to give adverse effect to the magnetic tape properties.

In Comparative Example 8 where the fine particles of aluminum oxide alone were used, the obtained film was very poor in slipperiness and also liable to produce a large amount of abrasion dust, worsening the electromagnetic properties of the magnetic tape made by using such a film.

Example 9:

A homogeneous solution consisting of 100 parts of methyl methacrylate, 25 parts of divinylbenzene, 22 parts of ethylvinylbenzene, 1 part of benzoyl peroxide and 100 parts of toluene was dispersed in 700 parts of water, and the dispersion was heated while stirring at 80° C. in a nitrogen atmosphere for 6 hours to effect polymerization.

The powder of the thus obtained crosslinked polymer having ester groups was about 0.1 mm in average particle size. The produced polymer was washed with demineralized water and then extracted twice with 500 parts of toluene to remove the unreacted monomers as well as linear polymer which were present in small quantities.

The polymer powder was then ground by an attritor for 2 hours and then by a sand grinder for 3 hours to obtain a fine crosslinked polymer powder having an average particle size of 1.0 μm.

Thereafter, 100 parts of dimethyl terephthalate, 70 parts of ethylene glycol and 0.09 part of calcium acetate monohydrate were mixed and heated in a reactor to carry out an ester exchange reaction. The reaction temperature was so controlled that it would be 165° C. at the start of the reaction, 200° C. after 2 hours and 230° C. after additional 2 hours.

After the ester exchange reaction has been substantially completed 4 hours later, 0.036 part of phosphoric acid and 0.40 part of the previously obtained crosslinked polymer powder having an average particle size of 1.0 μm were added to the reaction mixture, followed by further addition of 0.03 part of antimony trioxide as polymerization catalyst to carry out polymerization in an ordinary way. That is, temperature was gradually raised from 230° C. till reaching 280° C., while pressure was gradually reduced from normal pressure till reaching finally 0.5 mmHg. 4 hours later, the polymer was discharged out and made into chips (polyester (V)).

The above-described polyester preparation operations were again carried out except that 0.8 part of aluminium oxide with an average particle size of 0.02 μm, obtained by a pyrolytic method, was used in place of the crosslinked polymer having an average particle size of 1.0 μm to obtain polyethylene terephthalate (polyester (VI)).

It was observed that aluminium oxide was very uniformly dispersed in the polyester, and substantially no agglomerate of particles was seen.

Then polyester (V) and polyester (VI) were mixed in a weight ratio of 50:50 and the mixture, after dried, was extruded into a sheet at 290° C. from an extruder to obtain an amorphous sheet. In this operation, there was employed a so-called electrostatic charge cooling method in which the sheet is electrostatically charged. The obtained sheet was stretched 3.5 times in the machine direction and 3.4 times in the transverse direction and then subjected to a heat treatment at 225° C. to obtain a 15 μm thick biaxially stretched film.

A magnetic layer was formed by coating on the surface of the film to make a magnetic tape and its scuff resistance and electromagnetic properties were evaluated.

Comparative Example 9:

100 parts of dimethyl terephthalate, 70 parts of ethylene glycol, 0.10 part of calcium acetate monohydrate and 0.18 part of lithium acetate dihydrate were supplied into a reactor and heated to evaporate away methanol and carry out an ester exchange reaction. The mixture was heated to 230° C. over a period of 4 hours to substantially complete the ester exchange reaction.

To the reaction mixture, was added 0.31 part of triethyl phosphate, followed by further addition of 0.04 part of antimony trioxide, and the mixture was polymerized according to a conventional method for 4 hours to obtain a polyethylene terephthalate having an intrinsic viscosity of 0.66.

In the polyeser, were seen a large number of uniform and fine particles which have separated out. These particles had a size of 0.80 μm and the amount thereof was 0.37% by weight based on the polyester.

By using the polyester, there were produced a 15 μm thick biaxially oriented film in the same way as Example 9. Also, a magnetic tape was made by using the polyester film and its properties were evaluated.

Examples 10-12 and Comparative Examples 10-12:

15 μm thick biaxially stretched films were produced in the same way as Example 9 except that the particles to be contained in the polyeser film were changed as shown in Table 3. Also, magnetic tapes were made by using said polyester films in the same way as Example 9.

The results of evaluation of the properties of said polyester films and magnetic tapes are shown collectively in Table 3.

TABLE 3

| | Particles B | | | Particles A | | | Film properties | | | Magnetic tape properties | | |
|---|---|---|---|---|---|---|---|---|---|---|---|---|
| | Type | Av. particle size μm | Content in film wt % | Type | Av. particle size μm | Content in film wt % | Ra μm | Slipperiness | Abrasion resistance | Scuff resistance | S/N | Dropout |
| Example | | | | | | | | | | | | |
| 9 | Crosslinked polymer | 1.0 | 0.20 | Al$_2$O$_3$ | 0.02 | 0.40 | 0.022 | 0.34 | A | 5 | +2.0 | 1.7 |
| 10 | Crosslinked polymer | 1.0 | 0.15 | Al$_2$O$_3$ | 0.25 | 0.35 | 0.020 | 0.33 | A | 5 | +1.7 | 1.9 |
| 11 | Crosslinked polymer | 0.60 | 0.20 | SiC | 0.30 | 0.40 | 0.017 | 0.39 | A-B | 4-5 | +1.5 | 2.2 |
| 12 | Benzoguanamine | 0.70 | 0.50 | SiC | 0.70 | 0.20 | 0.028 | 0.28 | A-B | 4-5 | +1.2 | 2.5 |
| Comp. Example | | | | | | | | | | | | |
| 9 | Deposited particles | 0.80 | 0.37 | — | — | — | 0.020 | 0.35 | B | 1 | −3.2 | 18.0 |
| 10 | CaCO$_3$ | 0.50 | 0.20 | — | — | — | 0.015 | 0.43 | B-C | 1-2 | −1.8 | 10.5 |
| 11 | Crosslinked polymer | 1.0 | 0.20 | CaCO$_3$ | 0.40 | 0.20 | 0.026 | 0.31 | A-B | 1-2 | −1.7 | 10.1 |

TABLE 3-continued

| | Particles B | | | Particles A | | | Film properties | | | Magnetic tape properties | | |
|---|---|---|---|---|---|---|---|---|---|---|---|---|
| | Type | Av. particle size μm | Content in film wt % | Type | Av. particle size μm | Content in film wt % | Ra μm | Slipperiness | Abrasion resistance | Scuff resistance | S/N | Dropout |
| 12 | Al₂O₃ | 0.35 | 0.005 | — | — | — | 0.003 | 1 < | C | 1 | −3.0 | 14.8 |

The films of Examples 9–12, which met the specified requirements of the present invention, were all excellent in slipperiness and abrasion resistance. Also, the magnetic tapes made by using these films showed excellent scuff resistance and their electromagnetic properties were at a highly satisfactory level.

On the other hand, in the case of Comparative Example 9 were deposited particles alone were used, the obtained magnetic tape was poor in scuff resistance and therefore unsatisfactory in electromagnetic properties.

In the case of Comparative Example 10 where the calcium carbonate particles with a Mohs hardness of 3 alone were used and Comparative Example 11 which was the same as Example 9 except for use of calcium carbonate in place of aluminium oxide, the obtained magnetic tapes were unsatisfactory in scuff resistance, had many scuff marks on the film surface and were poor in electromagnetic properties.

In Comparative Example 12 where the aluminium oxide particles alone were used in a small amount, film slipperiness was very bad and also abrasion dust was produced in large quantities to adversely affect the electromagnetic properties of the magnetic tape.

Comparative Example 13:

100 parts of dimethyl terephthalate, 70 parts of ethylene glycol and 0.09 part of magnesium acetate tetrahydrate were heated in a reactor to evaporate away methanol and carry out an ester exchange reaction. The mixture was heated to 230° C. over a period of 4 hours to substantially complete the ester exchange reaction.

To the reaction mixture, was added 0.50 part of titanium dioxide having an average particle size of 0.35 μm, followed by further addition of 0.05 part of triethyl phosphate and 0.04 part of antimony trioxide to carry out a polycondensation reaction in the usual way, obtaining polyethylene terephthalate having an intrinsic viscosity of 0.65. Titanium dioxide was dispersed very uniformly in the polyester, and substantially no agglomerate of particles was observed.

This polyester was dried and extruded into a sheet from an extruder at 290° C. to obtain a 150 μm thick amorphous sheet. An electrostatic charge cooling method was used in this sheet forming operation. This amorphous sheet was stretched 3.8 times in the machine direction and 3.6 times in the transverse direction and then again stretched 1.07 times in the machine direction to obtain a 9.8 μm thick biaxially stretched film strengthened in the machine direction. On this film, was formed a magnetic layer to make a magnetic tape.

Example 13:

A biaxially stretched polyester film having a thickness of 9.8 μm was produced in the same way as Comparative Example 13 except that the particles contained in the polyester film were changed as shown in Table 4. Also, a magnetic tape was made by using the film in the same way as Comparative Example 13.

The results of evaluation of said film and magnetic tape are shown in Table 4.

TABLE 4

| | Particles A | | | Particles B | | | Film properties | | | | Magnetic tape properties | | |
|---|---|---|---|---|---|---|---|---|---|---|---|---|---|
| | Type | Av. particle size μm | Content in film wt % | Type | Av. particle size μm | Content in film wt % | Ra μm | Slipperiness | Abrasion resistance | F-5 Value (kg/mm²) | Scuff resistance | S/N | Dropout |
| Example 13 | Al₂O₃ | 0.03 | 0.35 | CaCO₃ | 0.50 | 0.20 | 0.016 | 0.40 | A | 14.5 | 5 | +2.1 | 1.7 |
| Comp. Example 14 | TiO₂ | 0.35 | 0.50 | — | — | — | 0.016 | 0.40 | A | 14.5 | 1 | −2.1 | 13.0 |

Example 14:

100 parts of dimethyl terephthalate, 70 parts of ethylene glycol and 0.20 part of magnesium acetate tetrahydrate were heated in a reactor to carry out an ester exchange reaction. 4 hours later, when the ester exchange reaction was substantially completed, 0.6 part of δ-type aluminum oxide having an average particle size of 0.03 μm obtained from pyrolysis of aluminum trichloride was added to the reaction system, followed by further addition of 0.06 part of ethyl acid phosphate and 0.04 part of antimony trioxide, and the mixture was subjected to a polymerization reaction in the usual way for 5 hours to obtain a polyester having an intrinsic viscosity of 0.63 (polyester (VII)).

Separately from the above, there were carried out the same operations as described above except for use of 0.6 part of calcium carbonate having an average particle size of 0.6 μm in place of aluminium oxide to obtain polyethylene terephthalate having an intrinsic viscosity of 0.63 (polyester (VIII)).

Then polyester (VII) and polyester (VIII) were mixed in a weight ratio of 50 : 50, and the mixture was dried and extruded into a sheet from an extruder at 290° C. to obtain an amorphous sheet. This sheet was stretched 3.5 times in the machine direction at 90° C. and 4.3 times in the transverse direction at 110° C. and then heat treated at 210° C. for 3 seconds to obtain a biaxially stretched film having a thickness of 15 μm.

A magnetic layer was formed on the film to make a magnetic tape.

The properties of the film and magnetic tape are shown in Table 5 along with those of other Examples described below.

Example 15

A polyester was produced in the same way as Examples 14 except that δ-type aluminum oxide having an average particle size of 0.1 μm obtained by heating boehmite in the air at 900° to 1,000° C. was used in place of δ-type aluminum oxide with an average particle size of 0.02 μm obtained from pyrolysis of aluminum trichloride.

A film was produced from the polyester in the same way as Example 14 and its properties were evaluated.

Example 16:

A film was obtained in the same way as Example 14 except that γ-type aluminum oxide with an average particle size of 0.02 μm obtained by heating ammonium aluminum carbonate hydroxide and calcium carbonate with an average particle size of 0.8 μm were mixed so that their content in the film would be as shown in Table 5.

Example 17:

A film was obtained in the same way as Example 14 except that the average particle size and content of γ-type aluminum oxide were changed as shown in Table 5.

TABLE 5

| | Particles A | | | Particles B | | | Abrasion characteristics of film | | | |
|---|---|---|---|---|---|---|---|---|---|---|
| Example | Type | Av. particle size μm | Content in film wt % | Type | Av. particle size μm | Content in film wt % | Abrasion on metallic pin | Abrasion on plastic pin | Scuff on magnetic layer | Abrasion on metal-deposited layer |
| 14 | δ-Al$_2$O$_3$ | 0.03 | 0.3 | CaCO$_3$ | 0.6 | 0.3 | 5 | 5 | 4-5 | 0.2 |
| 15 | δ-Al$_2$O$_3$ | 0.1 | 0.3 | CaCO$_3$ | 0.6 | 0.3 | 5 | 5 | 4-5 | 0.2 |
| 16 | γ-Al$_2$O$_3$ | 0.02 | 0.5 | CaCO$_3$ | 0.8 | 0.2 | 3-4 | 5 | 5 | 0.2 |
| 17 | γ-Al$_2$O$_3$ | 0.005 | 0.4 | CaCO$_3$ | 0.8 | 0.2 | 3-4 | 5 | 5 | 0.2 |

What is claimed is:

1. A polyester film for magnetic recording media, containing 0.05 to 5% by weight of inorganic particles (A) selected from the group consisting of particles of δ-aluminum oxide and particles of γ- aluminum oxide both having a Mohs hardness of 6 or above and an average particle size of 0.005 to 1.0 μm, and 0.01 to 2.0% by weight of inactive particles (B) having an average particle size which is greater than that of said particles (A) and in the range of 0.1 to 3.0 μm, the polyester film having an intrinsic viscosity in the range of 0.52 to 0.65.

2. A polyester film according to claim 1, wherein the inactive particles (B) are particles of heat-resistance polymer.

3. A polyester film according to claim 1, wherein the inactive particles (B) are inert particles which precipitate in the course of the polyester producing process.

4. A polyester film according to any of claims 1, 2 or 3, wherein the refractive index of the film in its thickness direction is 1.492 or above.

5. A polyester film according to any of claims 1, 2 or 3, wherein the thickness of the film is 12.0 μm or less and the F-5 value of the film in the machine direction is 12.0 kg/mm$^2$ or greater.

6. A polyester film according to any of claims 1, 2 or 3, wherein the double-refractive index Δn of the film defined by the following formula (1):

$$\Delta n = n_{TD} - n_{MD} \tag{1}$$

wherein n$_{TD}$ is refractive index of the film in the transverse direction, and n$_{MD}$ is refractive index of the film in the machine direction, is 0.010 or above.

* * * * *